No. 886,551. PATENTED MAY 5, 1908.
G. P. THOMAS.
TOOL OPERATING MACHINE.
APPLICATION FILED APR. 13, 1907.

6 SHEETS—SHEET 1.

WITNESSES:
J. Herbert Bradley.
Frank Rogers

INVENTOR
George Paul Thomas
by Christy and Christy
Atty's

No. 886,551. PATENTED MAY 5, 1908.
G. P. THOMAS.
TOOL OPERATING MACHINE.
APPLICATION FILED APR. 13, 1907.

6 SHEETS—SHEET 3.

WITNESSES:
J. Herbert Bradley.
Frank Rogers

INVENTOR
George Paul Thomas
by Christy and Christy,
Atty's.

No. 886,551. PATENTED MAY 5, 1908.
G. P. THOMAS.
TOOL OPERATING MACHINE.
APPLICATION FILED APR. 13, 1907.

6 SHEETS—SHEET 4.

WITNESSES:
J. Herbert Bradley.
Frank Rogers

INVENTOR
George Paul Thomas
by Christy and Christy,
Atty's.

No. 886,551. PATENTED MAY 5, 1908.
G. P. THOMAS.
TOOL OPERATING MACHINE.
APPLICATION FILED APR. 13, 1907.
6 SHEETS—SHEET 5.
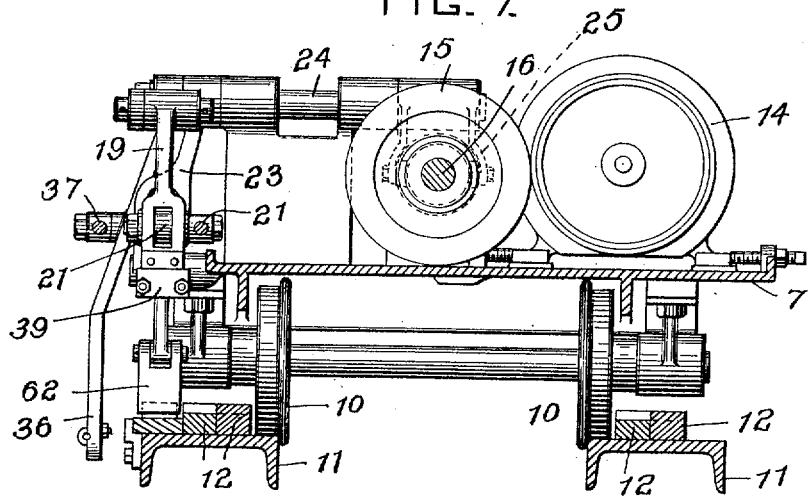
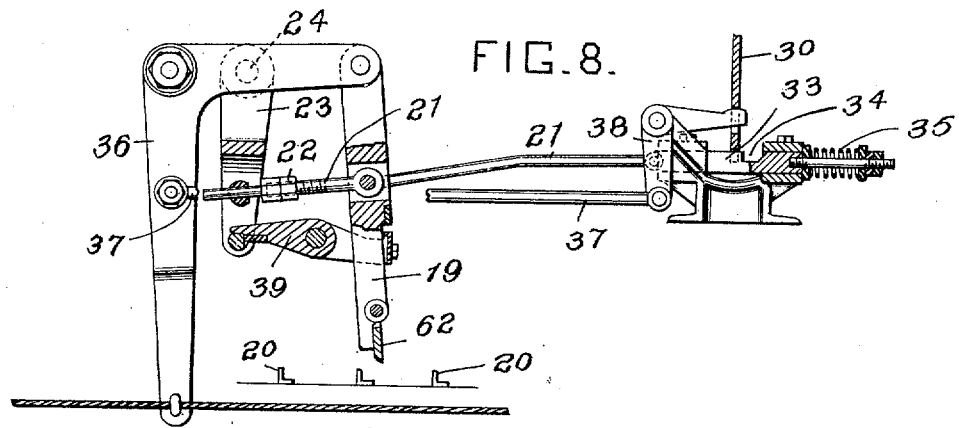
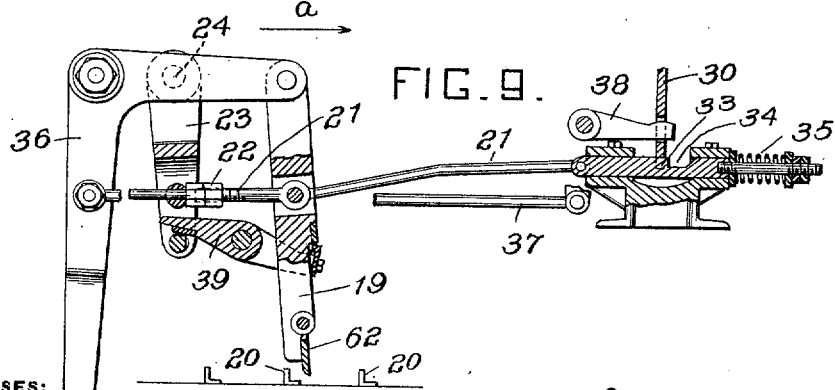

No. 886,551. PATENTED MAY 5, 1908.
G. P. THOMAS.
TOOL OPERATING MACHINE.
APPLICATION FILED APR. 13, 1907.
6 SHEETS—SHEET 6.
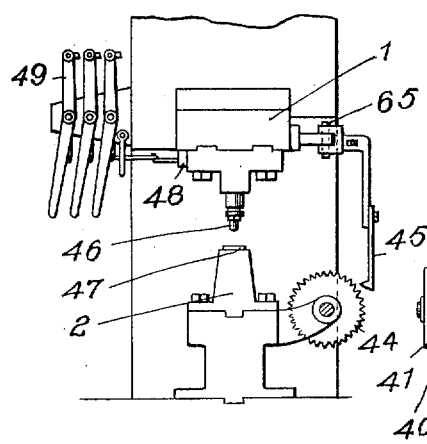
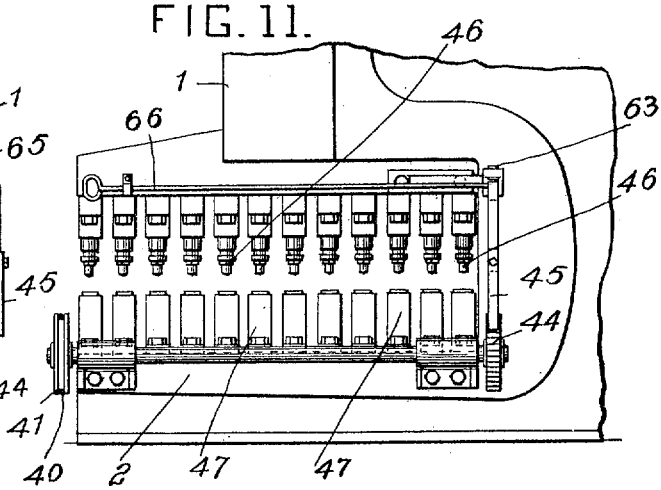
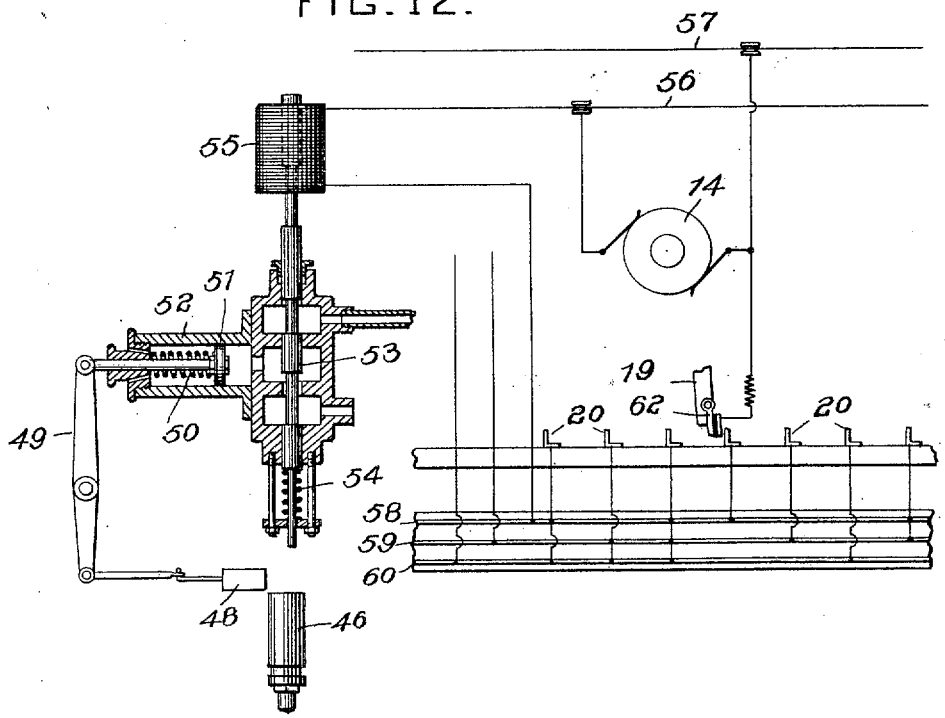
WITNESSES:
J. Herbert Bradley.
Frank Rogers
INVENTOR
George Paul Thomas
by Christy and Christy
Atty's
THE NORRIS PETERS CO., WASHINGTON, D. C.

UNITED STATES PATENT OFFICE.

GEORGE PAUL THOMAS, OF PITTSBURG, PENNSYLVANIA.

TOOL-OPERATING MACHINE.

No. 886,551.　　　　Specification of Letters Patent.　　　　Patented May 5, 1908.

Application filed April 13, 1907. Serial No. 367,945.

*To all whom it may concern:*

Be it known that I, GEORGE PAUL THOMAS, residing at Pittsburg, in the county of Allegheny and State of Pennsylvania, a citizen of the United States, have invented or discovered certain new and useful Improvements in Tool-Operating Machines, of which improvements the following is a specification.

In Letters Patent of the United States No. 835,123, dated November 6th, 1906, I have shown and described certain improvements in tool-operating machines; and my present invention lies in the same field, and is concerned with the modification of structural detail, to the end that the automatic character of the machine shall be improved, and my invention is further concerned with extending the automatic feature and rendering it better adapted to practical necessities.

Figure 1:
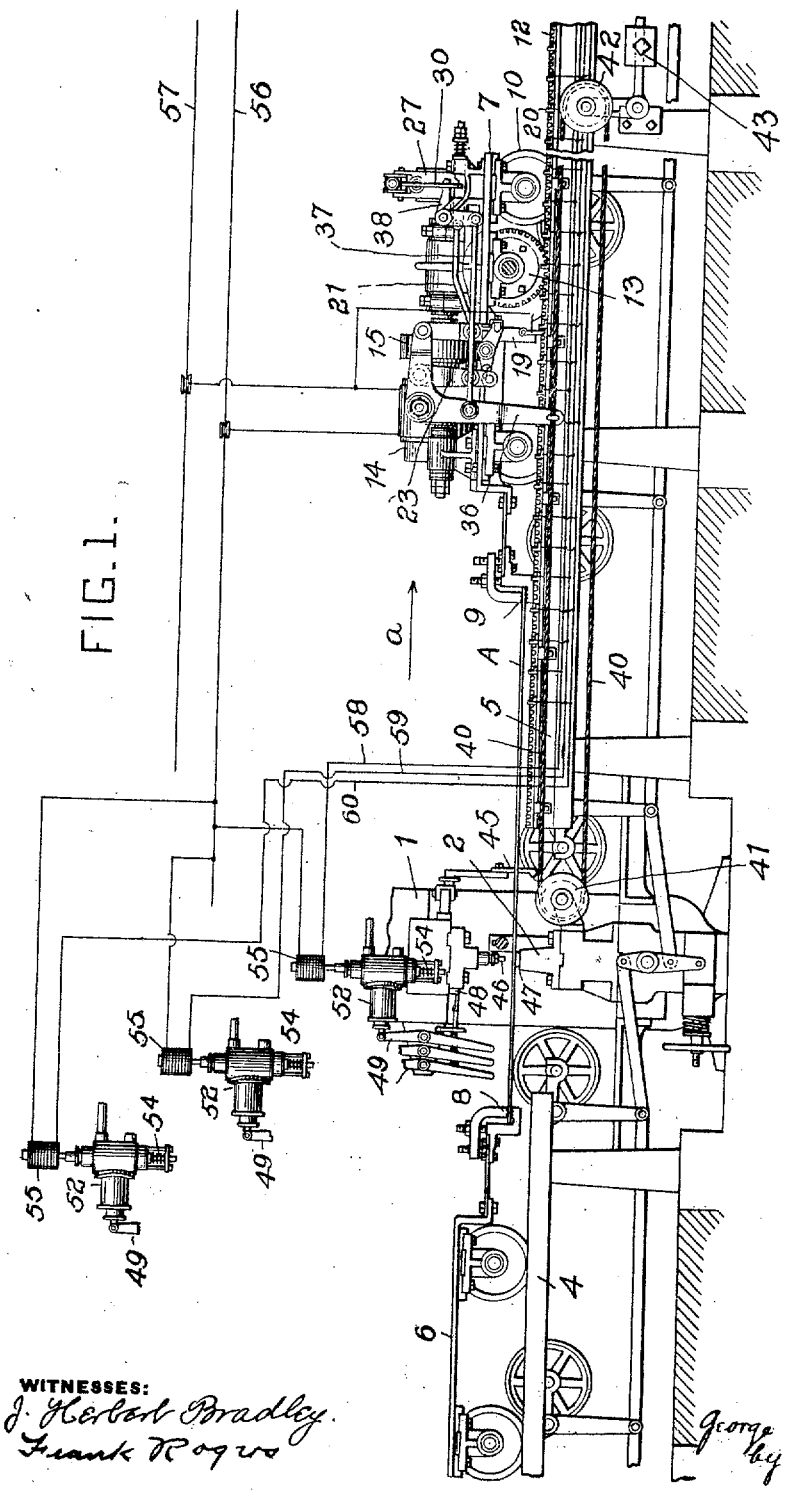
Figure 2:
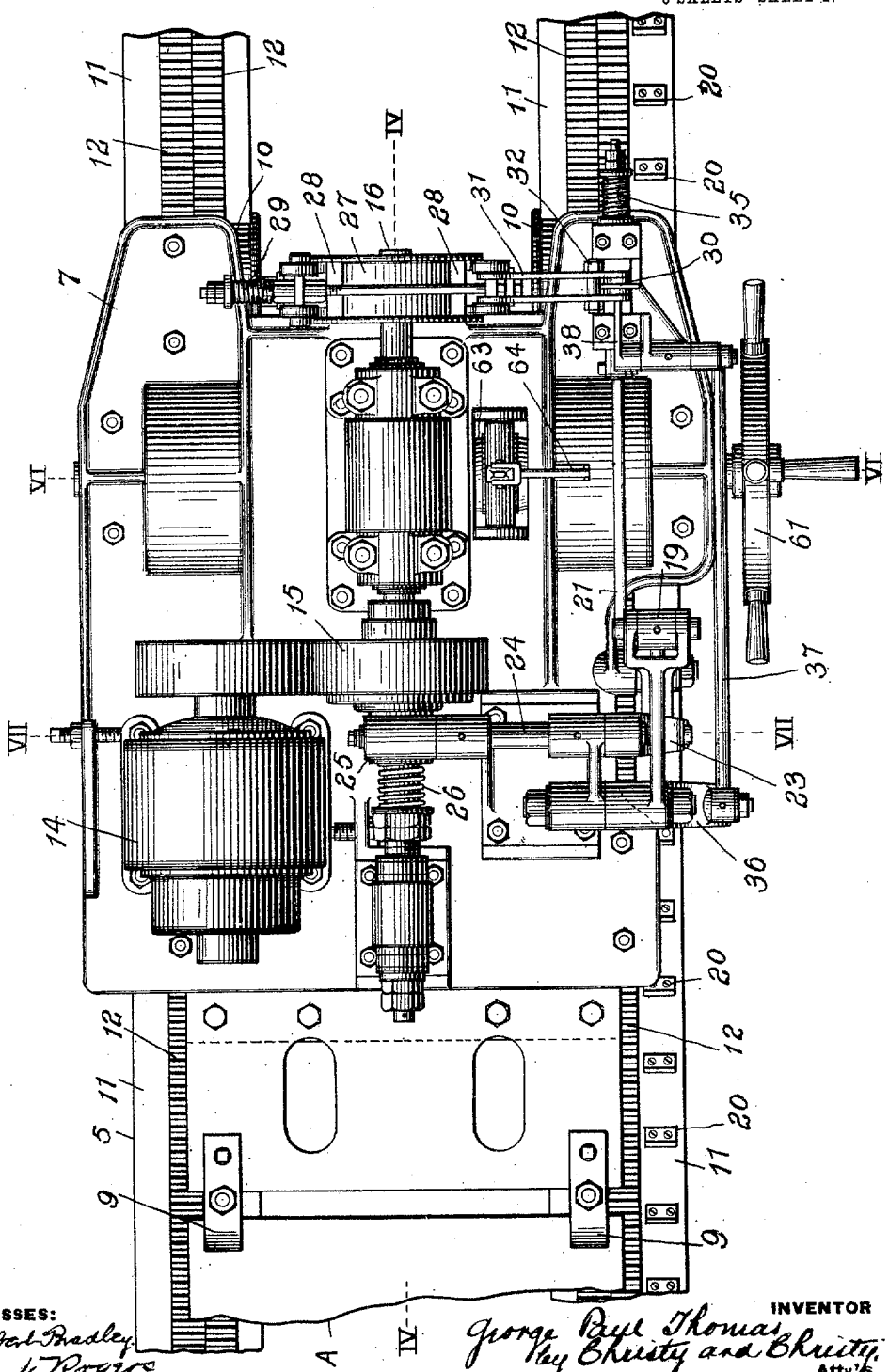
Figure 3:
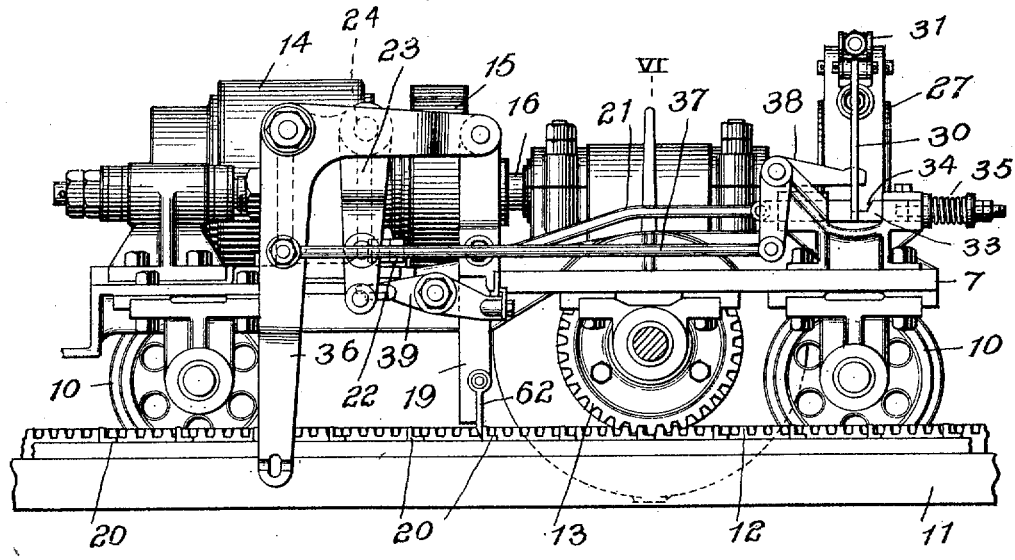
Figure 4:
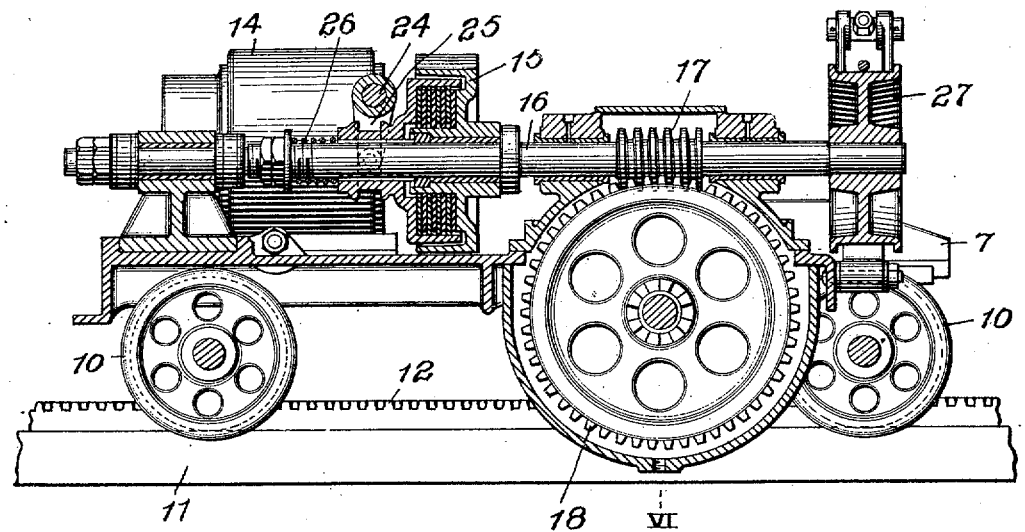
Figure 5:
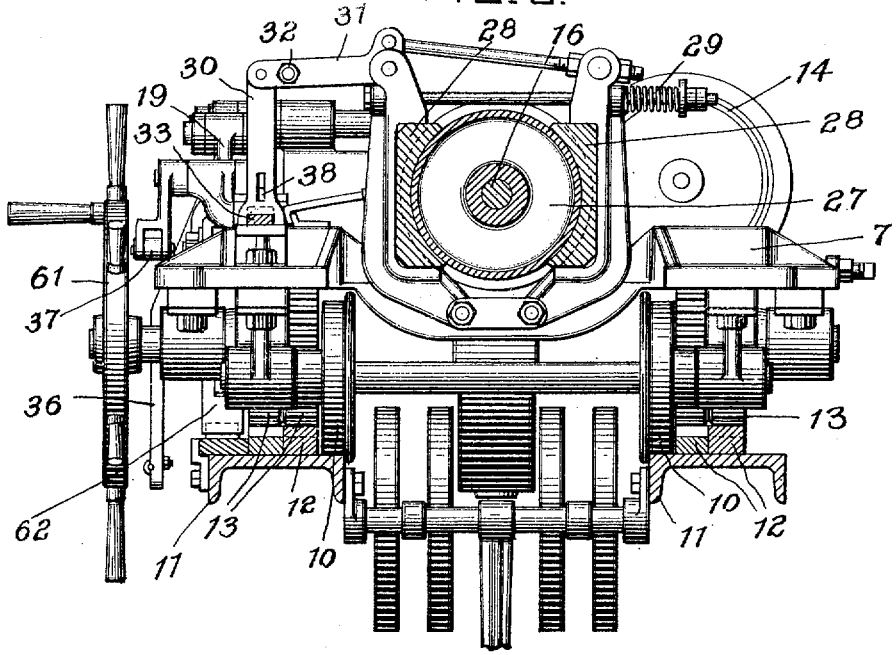
Figure 6:
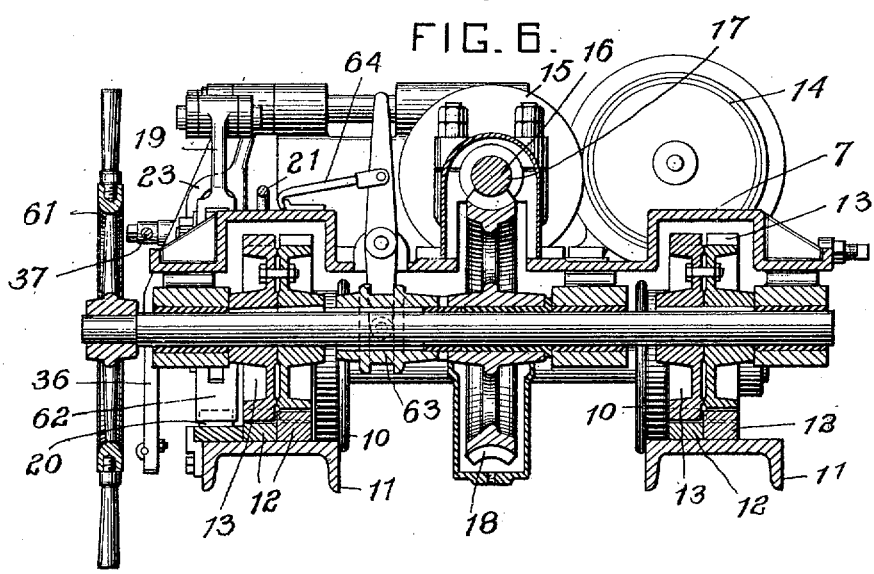

In the accompanying drawings which form part of this specification, Figure 1 illustrates the entire machine in side elevation, the electrical connections and the gag-operating devices being shown diagrammatically; Fig. 2 is a plan view on larger scale of the motor carriage in place upon the table; Fig. 3 shows the carriage in side elevation; Fig. 4 is a view thereof in vertical and longitudinal section, the plane of section being indicated at IV—IV, Fig. 2; Fig. 5 shows the carriage in end elevation, the brake-device however being shown in vertical section; Figs. 6 and 7 show the carriage in transverse vertical section, the planes of section being indicated at VI—VI and VII—VII, respectively, Fig. 2; Figs. 8 and 9 show partly in side elevation and partly in section various detached parts of the carriage; Figs. 10 and 11 show in side and in front elevation the tool carrier and anvil; and Fig. 12 is a diagrammatic view showing the gag which moves to control the operation of the tool and the mechanism by which the movement of the gag is in turn controlled.

Parts which are repeated in the several figures bear the same reference numerals in each case.

Referring first to Fig. 1, it will be seen that the machine consists essentially of a tool-carrier, 1, which reciprocates (by mechanism not shown and the character of which is not essential to the present invention) vertically above an anvil block 2. At either side of the anvil block, 2, are arranged tables, 4 and 5, upon which travel carriages, 6 and 7. The carriages are provided with jaws, 8 and 9, for grasping opposite ends of a piece of work such as is indicated at A upon which the tool or tools are to operate. When the jaws with which the carriages are provided are grasping opposite ends of a piece of work and are traveling coincidently upon their respective tables, the work passes progressively beneath the tool carrier 1. The two tables 4 and 5 are equipped with work-sustaining rolls, and these rolls are vertically movable and arranged to move in unison, and means are provided for adjusting the height of the rolls, that whatever be the weight of the work it may be suitably held over anvil 2. These general features are all of them described in my earlier patent No. 835,123, referred to above.

This invention is primarily directed to the intermittent movement or advance of the work upon the anvil and beneath the tool-carrier, to the stopping of the work at desired intervals, and to the automatic operation of the gags in the tool-carrier, that upon the successive stoppages of the work and the coincident successive operations of the tool-carrier, certain of the individual tools or certain combinations of individual tools shall be operative, according to a predetermined plan.

Directing attention first to the advance and the intermittent stopping of the work upon anvil 2, carriage 7 is equipped with a traction mechanism; and means are provided which will presently be described for interrupting the traction mechanism in its operation and thereupon bringing the carriage to rest, not by an abrupt locking of parts in unyielding engagement, but by a yielding engagement of parts such as on the one hand effects stopping at accurately determined points, and on the other hand relieves the machine of undue jarring or racking. Figs. 2–7 show this motor carriage in plan, elevation, and section. The jaws 9, for grasping the work are not shown in these figures, but comparison of Figs. 1 and 3 will show where the gripping jaws are carried. The carriage, 7, mounted upon wheels, 10, travels upon tracks, 11, suitably placed upon table 5. Racks, 12, are also placed upon table 5, extending to correspond with the movement of the carriage; and pinions, 13, mounted in the carriage, are arranged to engage these racks throughout the range of movement. Means are provided for driving the pinions, 13, to cause the carriage to advance upon the table; and to this end a motor, 14, may be mounted in the carriage with operative connections to said pinions. Such motor may be driven from any suitable source of power; as shown in the drawings it is an electric motor and the lead wires for the driving current are shown. This motor is constantly driven and in one direction; and, so long as the interposed mechanism is suitably arranged to that end, the carriage 7 advances with corresponding uniformity in the direction indicated by the arrow, a, Fig. 1.

The means which are employed for stopping the carriage at predetermined intervals in its traverse, and which form part of the present invention, are essentially different from the means employed for the same end and shown in my prior patent No. 835,123, above referred to; and, as intimated above, the means here employed effect a yielding, as contrasted with an abrupt stop. As in the earlier form, I still employ a finger pivoted in the carriage and extending to make contact with stops placed at proper intervals upon the tables; and this finger, carried by the moving carriage, on contact with the successive stops, sets in motion a chain of instrumentalities which effect the stopping of the car.

Motor 14, through suitable interposed mechanism, drives one member of a clutch, 15, the other member of the clutch being keyed to a shaft, 16, but slidable thereon to and from operative engagement with its fellow clutch member. Shaft 16, when rotating, drives the carriage forward, through any preferred interposed mechanism, as for example a worm, 17, engaging worm wheel, 18, mounted on the axle of pinion 13, and preferably operatively connected with said axle by a separable clutch, 63. The pinions 13, as above described, engage racks 12 on the table to effect the advance of the carriage.

The finger, 19, pivotally mounted in the carriage, is so arranged that as the carriage advances it contacts with and is swung by stops, 20, which are placed upon the table and are so positioned as to effect the recurrent movement of the finger and the consequent operation of the connected parts at the desired intervals in the advance of the carriage and corresponding advance of the work beneath the tool.

Referring particularly to Figs. 9 and 3, the former shows finger 19 in inoperative position. As the carriage advances, finger 19 is carried forward, engages the next succeeding stop 20, and is swung to the position shown in Fig. 3. This swing of finger 19 is communicated through suitable instrumentalities to open clutch 15, thus breaking operative connection between the motor and shaft 16, which shaft when rotating drives the carriage. These instrumentalities, as shown in the drawings, may be briefly traced. Upon finger 19 is secured a rod, 21, and this rod 21 carries a shoulder or abutment 22, which bears upon a correspondingly arranged abutment upon a crank arm, 23, rigidly carried on a shaft, 24; another crank arm, 25, rigidly secured to the same shaft 24, carries at its extremity the movable member of clutch 15. Through these means, the swinging of finger 19 effects a shifting of the movable member of clutch 15 against the opposed tension of a spring, 26, which normally holds the members of the clutch in operative engagement. A dog, 39, pivoted in the carriage body, and so weighted as to swing to the horizontal position shown in Fig. 3 when free to do so, rests in the position shown in Fig. 9 on a suitably arranged shoulder in the crank arm 23, while the carriage is advancing on the table. When, however, the swinging of finger 19 effects a swinging of crank arm 23, dog 39 falls to the position shown in Figs. 3 and 8, maintaining the clutch in open position until positive release is effected in the manner to be presently described. In such manner the pinion and rack driving means are at predetermined intervals relieved of the traction power derived from the motor. But further, that the carriage (and the work) may come positively to a stand when the communication of power is interrupted, I provide a brake mechanism, positively acting, and yet one which absorbs the momentum of the parts when brought to rest without undue strain and with precision in results. Upon shaft 16 is rigidly secured a drum, 27, (see particularly Figs. 4 and 5) and, coöperating with this drum are a pair of brake shoes, 28, pivoted to swing together and grasp the drum between them under the compressing action of a spring, 29. While clutch 15 is closed, and while shaft 16 is being driven, the brake shoes are held away from frictional contact with drum 27; but, coincident with the release of clutch 15, in the manner already described, the brake shoes are applied to bring the carriage to a stand. To this end, the brake device is conveniently connected to finger 19 by suitable interposed mechanism, that the swinging of finger 19 shall not only release clutch 15 but shall coincidently apply the brakes. The interposed mechanism for effecting this end may be briefly pointed out. It will be understood that in details of mechanical construction I do not consider my invention to be limited to the instrumentalities illustrated.

Referring particularly to Figs. 5, 8, and 9, a slide, 30, mounted in the carriage, moves vertically upward to compress spring 29 and open the brake shoes 28, and when relieved of support and permitted to descend, it is driven downward by spring 29 which at the same time carries the brakes into engagement upon drum 27. In other words, slide 30 is a latch, alternately holding the brakes open and leaving them free to close in response to spring tension. This movement of slide 30 is made effective to the described ends through a bell crank lever, 31, fulcrumed at 32, connected to the free ends of the brake shoes. The lower end of slide 30 rests upon a horizontally moving slide, 33. In the upper face of this slide 33 is a notch, 34; but the slide 33 is normally held by a spring, 35, so that the vertical slide 30 rests upon the higher portion of the horizontal slide adjacent to the notch, as shown in Figs. 8 and 9.

A rod connects the horizontal slide, 33, with finger 19, and this may conveniently be a continuation of rod 21; and the arrangement is such that, upon the swinging of finger 19 in response to engagement with a stop 20 in the manner already described, the horizontal slide 33 will be shifted and the vertical slide 30 will descend and rest in notch 34, and upon such shifting of slide 30 the brakes are applied.

It will thus be seen that, by the instrumentalities described in detail, the advance of the carriage and the periodic contact of finger 19 with successive stops 20 effects the coincident interruption of power and application of the brakes. When the carriage is thus brought to a stand, and the work accordingly brought to rest upon the anvil, the tool operates. The carriage is then to be set in motion to advance the work to the next position in which the punches are to act on it.

The means for releasing finger 19, setting it for repetition of its function, and for releasing the brakes and starting the carriage again will now be described.

A bell crank lever, 36, is pivoted in the frame of the carriage, and by movement of this lever the several objects last above stated are effected. Lever 36 carries finger 19 pivoted in the extremity of one arm. So long as lever 36 remains immovable—and during the operations hereinabove described it is immovable—finger 19 swings as though pivoted immediately in the carriage frame. When, however, lever 36 swings, the arrangement is such that finger 19 is caused to move bodily up and down.

As shown in Fig. 3, finger 19, contacting with a stop 20, has swung through its normal pivotal movement and by the instrumentalities already described has effected the release of the carriage from the motive power and the application of the brakes. In order to release the brakes, reapply the power, and incidentally to set finger 19 for engagement with the next succeeding stop 20, lever 36 is caused to swing to the position shown in Fig. 8, and is then brought again to its initial position, shown in Fig. 9.

The forward swing of lever 36 effects the elevation of slide 30 against the tension of spring 29. The instrumentalities through which this is accomplished in the specific structure shown are a rod or pitman, 37, and another bell crank lever, 38. The elevation of this slide releases the brakes, as already described. Such forward swing of lever 36 not only raises slide 30; it elevates finger 19 bodily, until it is free of contact with stop 20; and thereupon the tension of spring 35 causes horizontal slide 33 to shift to proper position for holding vertical slide 30 in elevated position with brakes released. Simultaneously, through rod 21, finger 19 swings forward to the position shown in Fig. 8. Thus, upon the forward swing of lever 36, finger 19 is released from the stop 20 which it has last engaged and the brakes are thrown off.

The swinging of the lever 36 back to the position shown in Figs. 3 and 9 carries finger 19 bodily downward to such position that, as the carriage advances, it will engage the next succeeding stop 20 and in so doing set in motion the series of described instrumentalities; it also simultaneously effects the closing of clutch 15 and the consequent advance of the carriage. Dog 39 has up to this time held the clutch open, from the time it was opened by the initial swinging of finger 19. That finger now descending from the position shown in Fig. 8 to that shown in Fig. 9 depresses the free end of dog 39, raises it from locked engagement with crank arm 23; and, the tension of spring 26 becoming thereupon effective, shaft 24 turns, and the clutch closes, bringing the parts to the initial position shown in Fig. 9. It remains only to observe that, while finger 19 descending to the position shown in Fig. 9 trips dog 39, as just described, yet the construction is such that when finger 19 again swings to the position shown in Fig. 3 and in so doing swings crank arm 23 to open the clutch, dog 39 is free to take the locking position shown in Figs. 3 and 8.

Having now described in detail the various carriage-operating mechanisms, I turn to the next feature of my invention, namely, the dependence of the operation of the carriage upon the operation of the tool. Referring to Fig. 1, the tool carrier 1, descends, the tool operates upon the work A resting on anvil 2, and the carrier then rises again. The tool carrier is caused to descend when the carriage 7 has come to a stand and the work A is at rest on the anvil. I make the further advance of carriage 7 automatically dependent on the traverse of the tool carrier. In my preferred construction, the free arm of lever 36 is secured to an endless rope, 40, which is mounted on sheaves, 41 and 42, at opposite ends of table 5. As the carriage 7 advances, the rope travels on its sheaves. The rope may be kept taut by a weight, 43, which is carried in one arm of a bell crank lever, the sheaves 42 being journaled in the other arm. From Figs. 1, 10, and 11 it will be seen that the sheaves 41 carries on its axle a ratchet wheel, 44, and that the punching head 1 carries a coöperating pawl, 45. The parts are so arranged that the descent of the punching head 1, through the pawl and ratchet described, pulls rope 40 and swings lever 36 from the position shown in Fig. 3 to that shown in Fig. 8; and the return of punching head 1 to its initial elevated position, through the same instrumentalities, effects a pull of rope 40 in opposite direction, bringing lever 36 again to its initial position. The effects of such shifting of lever 36 have already been described. It will be observed that it is a mere matter of adjustment to suitably time the release of the brakes and the starting of the carriage to the reciprocation of the tool-carrier.

Another feature of my present invention is the automatic setting of the individual tools with which the tool carrier is equipped. The tool-carrier is shown in Fig. 1 in its relation to other parts of the machine; it is shown in detail in Figs. 10 and 11; and Fig. 12 shows in a diagrammatic way the means for automatic setting of the tools.

The drawings show a particular kind of a tool-operating machine, namely, a punching machine. The tool carrier or head, 1, is equipped with a series of individual punches, 46, set closely in transverse line; and the anvil, 2, is provided with a corresponding series of individual anvil blocks, 47. The individual punches are movable in the punching head, and when not controlled in the manner to be described, recede on contact with the work into the punching head, and so receding cut no holes. Each individual punch is however controlled by a gag. A gag is a block carried in the punching head, movable to and from position behind the individual punch, and when in operative position it holds its individual punch against retraction, and the punch thus held to operation cuts a hole in the work upon the descent of the punching head. The practical advantage derivable from the use of such a punching head is that particular adjustment of the work beneath the punching head for each hole or series of holes is rendered unnecessary; for, within certain limits—and for all ordinary purposes the capacities of such a machine in this regard are sufficient—, holes may be punched at any desired point or points across the width of a piece of work when resting upon the anvil of the machine. Such a punching head, equipped with a plurality of gag-controlled punches, is described in my prior patent above referred to, No. 835,123, and my present invention is concerned, not with the construction of the punching head itself, but with the operation of the gags with which such a punching head is equipped.

A single detached gag is shown at 48 in Fig. 12. It will be understood that each one of the series of punches 46 in the punching head 1 will be provided with such a gag. Each gag is movable in the head for the purposes described. My present invention involves means operative on the advance of carriage 7 upon the table for automatically shifting the individual gags, that upon each descent of the punching head holes shall be cut in the work at desired intervals. To this end, I preferably make the shifting of the individual gags dependent on the contact of finger 19 with successive stops 20, and that by interposed instrumentalities which I shall now describe.

Referring to Fig. 12, it will be observed that gag 48, carried on one arm of a compound lever, 49, of which the other end is held against movement by a spring, 50, is normally held in inoperative position; and that it is only on compression of spring 50 and the corresponding traverse of the follower, 51, to the left, that gag 48 is carried to position behind punch 46, to cause said punch to perform its office on the descent of the punching head. Spring 50 is compressed and gag 48 shifted by suitable means, preferably fluid pressure; and, to this end, follower 51 constitutes a piston within a pneumatic cylinder, 52. Compressed air (or other fluid under pressure) is admitted to cylinder 52 to drive piston 51, or cylinder 52 is put in communication with an exhaust, according to the position of a controlling valve 53. The gags may be arranged singly or in groups, each gag or each group of gags being controlled by a separate valve. Each valve 53 is normally held to exhaust position (i. e. the position permitting the gag 48 to remain open) by a spring, 54; and is shifted to the described alternative position by the action of an electro-magnet, 55, to the armature of which valve 53 is connected. This electro-magnet is energized from any suitable source of electric energy; and the circuit is closed upon the advance of finger 19 into contact with a stop 20. The gags are thus connected, singly or in groups, with a series of electro magnets; and any one or more magnets may be connected to any one or more of the succeeding stops 20 with which finger 19 is to come successively into contact. By such an arrangement, it will be observed, each succeeding contact of finger 19 with a stop 20 effects a setting of the gags in punching head 1, to effect the punching of holes at certain predetermined intervals across the width of the work upon the next ensuing descent of the punching head.

I have shown, diagrammatically, in Figs. 1 and 12 how three electro-magnets, each controlling the gags of different individual punches or combinations of punches, may be connected for operation in predetermined manner. The motor 14, receiving its motive power through line wires 56 and 57, may conveniently be the immediate source of the currents which energize the several electro-magnets 55. Traveling contacts borne by carriage 7 close the circuit from the line wires through the motor 14, in a well understood manner. The coils of the several electromagnets 55 are electrically connected with one of the lead wires 56 and thus with motor 14. The opposite ends of the coils of the magnets 55 are connected electrically with a corresponding number of conductors, 58, 59, and 60, which conveniently extend along table 5. Connection is then made between each stop 20 and any one or more of the conductors 58, 59, and 60, as indicated in Fig. 12. Finger 19 is connected electrically with motor 14. It will be observed that in such manner each of the several stops 20 shown in Fig. 12 is arranged to effect a different pattern of holes punched in the work on the corresponding descents of the punching head. Such a gag control of the punches in a punching machine is well known, and it will be understood that my improvement in this connection is applicable alike to punching machines and to other tool-operating machines equipped with a plurality of individual gag-controlled tools.

The operation of the parts thus far described will readily be understood. At the outset, the several stops 20 are so placed along the table as to effect the stopping of the work upon the anvil at desired intervals, and the several stops are connected with the several conductors 58, 59, etc. in such manner as to effect the punching of holes in desired pattern on the successive operations of the punching head. The carriages 6 and 7 initially stand at the left upon their several tables, and the work A is secured in the engaging jaws, 8 and 9. All preliminary adjustments being made, power is imparted to motor 14. Thereupon carriage 7 advances in the direction indicated by arrow a, drawing forward the work A as well as carriage 6. This advance is continued until finger 19 meets the first of the stops 20; thereupon, through the pre-arranged connections, gags 48 slip to place behind certain of the punches 46 in the punching head 1, thus "arming" these punches for the cutting operation. The carriage advances, and finger 19 swings; thereupon clutch 15 is opened, the motive power cut off, brakes 28 applied, and carriage 7 brought to a stand. The descent of the punching head follows, and the armed punches cut holes in the work then resting upon the anvil. As the head descends, pawl 45 engaging pinion 44 turns the pinion and shifts lever 36. The initial shifting of lever 36 opens the brakes of the carriage and raises finger 19 clear of stop 20. Thereupon the electromagnets 55 are deënergized, and the pneumatic valves 53 are shifted by springs 54 and pressure in cylinders is relieved. Before the gags can slip back to inactive position, however, they are caught and held by the pressure with which the descending tool bears upon the work, but when the punches reach the limit of their downward stroke and begin to rise again the gags relieved of the stress slip back in response to the unopposed tension of springs 50. The punching head having reached the limit of its traverse, begins to rise; as it rises, pawl 45 shifts pinion 44 in opposite direction, carrying lever 36 back to initial position. Finger 19 then descends to normal position in advance of the stop last engaged and ready to engage the next succeeding stop as the carriage advances. As finger 19 descends, clutch 15 is again closed, and the carriage again advances to repeat the described cycle of operations on contact between finger 19 and the next stop 20. The response to the rising of the punching head in the advance of the carriage is not so immediate but that the punches are clear of the work before the work moves forward. When carriage 7 has traversed table 5, and in its advance carried the work A beneath the punch, the carriage itself is to be brought again to initial position at the left end of table 5. To this end the connection of gear wheel 18 to the axle of pinions 13 is through a clutch 63, when the carriage has traversed the table in response to the driving power of motor 14, and it is desired that the carriage be moved in opposite direction, clutch 63 connecting gear-wheel 18 with the axle of pinions 13 is opened by shifting an operating rod 64; and a hand wheel 61, shown in Figs. 2 and 6, carried on the end of the shaft of pinions 13 is turned to drive the carriage rearward. Any desired source of power may be employed in place of hand power to this end.

It will be observed that the tip of finger 19 is provided with a tooth, 62, which actually engages the stops 20. This tooth is pivoted in the finger to yield as the carriage recedes and so permit passage rearward over the stops 20.

It is obvious that hand wheel 61 may be employed to effect the advance of the carriage, thus dispensing with the motor and its connections in that respect. In such case, the remaining parts of the machine will operate in their normal manner already described. The motor or other source of electric energy will however be employed for operating electromagnets 55.

Pawl 45 which effects the shifting of lever 36 on the traverse of the punching head may be pivoted as at 65, and thus capable of being shifted as by a rod 66, out of operative relation to pinion 44. When this automatic device is thus thrown out of service, it will be understood that the rope 40 by which lever 36 is shifted may be pulled by hand at the desired intervals in the operation of the machine; or independently controlled operating instrumentalities may be employed if desired.

I claim as my invention:

1. In a tool-operating machine, the combination, with a carriage engaging the work and movable upon a table to bring the work to position beneath the tool, of means for moving said carriage upon the table, and a yieldingly applied brake for stopping the moving carriage, substantially as described.

2. In a tool-operating machine, the combination, with a table and a carriage engaging the work and movable upon said table to bring the work to position beneath the tool, of a driving mechanism for said carriage, a brake for said driving mechanism, and means automatically operative on the movement of said carriage upon said table for applying said brake, substantially as described.

3. In a tool-operating machine, the combination, with a table and a carriage engaging the work and movable upon said table to bring the work to position beneath the tool, of a driving mechanism for said carriage, a motor, separable power-imparting connection between said motor and said driving mechanism, a brake for said driving mechanism, a lock for holding said brake in inoperative position, and means automatically operative on the movement of said carriage upon said table for separating said separable power-imparting connection and releasing said lock for said brake, substantially as described.

4. In a tool-operating machine, the combination, with a carriage engaging the work and movable upon a table to bring the work to position beneath the tool, of a shaft rotatably mounted in said carriage, means for rotating said shaft, means for applying the rotation of the shaft to move said carriage upon the table, a brake device for said shaft, and means put simultaneously into operation for disconnecting said shaft from said shaft-rotating means and applying said brake device, substantially as described.

5. In a tool-operating machine, the combination with a carriage engaging the work and movable upon a table to bring the work to position beneath the tool, of means for moving said carriage upon the table, such carriage-moving means including a power-transmitting rotating shaft, a brake drum borne by said shaft, a brake shoe movable to and from engagement with said brake drum, means for causing said brake shoe to engage said drum with yielding force, and means operative on movement of the carriage for interrupting said carriage moving means and for applying said brake shoe to said brake drum, substantially as described.

6. In a tool-operating machine, the combination with a carriage engaging the work and movable upon a table to bring the work to position beneath the tool, of a driving mechanism for said carriage, a brake for said driving mechanism, means put simultaneously into operation for interrupting said carriage-driving mechanism and applying said brake, and further means for releasing said brake and reapplying said carriage-driving mechanism, substantially as described.

7. In a tool operating machine, the combination, with a carriage engaging the work and movable upon a table to bring the work to position beneath a tool, of a driving mechanism for said carriage, a brake for said driving mechanism, means for simultaneously interrupting said carriage-driving mechanism and applying said brake, and further means for successively releasing said brake and reapplying said carriage-driving mechanism, substantially as described.

8. In a tool operating machine, the combination of a reciprocating tool, a movable work support, means for moving the work support into operative relation to the tool, means for arresting the operation of the support operating means, means for stopping the work support in operative position and means operative to release the stopping means and permit the operation of the work support operating means on the reciprocation of the tool.

9. In a tool operating machine, the combination of a reciprocating tool, a movable work support, means for moving the work support into operative relation to the tool, means for disconnecting the operating means from the work support, means for stopping the movement of the work support in operative relation to the tool, means operative to release the stop mechanism on the downward movement of the tool and means for re-connecting the operative means to the work support on the upward movement of the tool.

10. In a tool-operating machine the combination of a reciprocating tool, a carriage engaging the work and movable upon a table to bring the work to position beneath the tool, a driving mechanism for said carriage, a brake for said driving mechanism, means for interrupting said carriage-driving mechanism and applying said brake, and means operative on reciprocation of said tool for releasing said brake and reapplying said carriage-driving mechanism, substantially as described.

11. In a tool-operating machine the combination of a reciprocating tool, a carriage engaging the work and movable upon a table to bring the work to position beneath the tool, a driving mechanism for said carriage, a brake for said driving mechanism, means for interrupting said carriage-driving mechanism and applying said brake, means operative on the descent of the tool for releasing said brake, and further means operative on the rising of the tool for reapplying said carriage-driving mechanism, substantially as described.

12. In a tool-operating machine, the combination with a carriage engaging the work and movable upon a table to bring the work to position beneath the tool, of a driving mechanism for said carriage, a brake for said driving mechanism, a finger pivoted in said carriage extending into line with a stop borne by the table and movable upon its pivot on contact with such stop and advance of said carriage, and means operative on such swinging of said finger for interrupting said carriage-driving mechanism and applying said brake, substantially as described.

13. In a tool-operating machine, the combination with a carriage engaging the work and movable upon a table to bring the work to position beneath the tool, of a driving mechanism for said carriage, a brake for said driving mechanism, a lever pivoted in said carriage, a finger pivoted in said lever, such finger extending when the lever is in normal inoperative position into line with a stop borne by the table and movable upon its pivot on contact with such stop and advance of said carriage, means operative on such swinging of said finger for interrupting said carriage-driving mechanism and applying said brake, means operative on the swinging of said lever for releasing the previously applied brake and for reapplying the previously interrupted carriage-driving mechanism, substantially as described.

14. In a tool-operating machine, the combination, with a reciprocating tool carrier equipped with a gag-controlled tool, a table, a carriage engaging the work and movable upon said table to bring the work to position beneath the tool, of means operated by the advance of said carriage upon said table for shifting the gag in said tool-carrier to tool-supporting position, and means operated on the descent of said tool for releasing the gag from control of said gag-shifting means, substantially as described.

15. In a tool-operating machine, the combination, with a reciprocating tool-carrier equipped with a gag-controlled tool, a table, a carriage engaging the work and movable upon said table to bring the work to position beneath said tool, of means operated by the advance of said carriage upon said table for shifting the gag in said tool-carrier to tool-supporting position against the tension of a spring, and means operated on the descent of the tool for releasing the gag from control of said gag-shifting means and leaving it free to move in response to said spring tension when relieved of the stress of operation, substantially as described.

16. In a tool-operated machine, the combination with a reciprocating tool-carrier, a gag-controlled tool borne therein, a gag for controlling said tool, a table, a carriage engaging the work and movable on the table to bring the work to operative position beneath said tool, and a driving mechanism for said carriage, of an electro magnet, means for shifting said gag upon the energizing of said electro-magnet, means operated by the movement of said carriage upon said table for simultaneously interrupting said carriage driving means and energizing said electro magnet, means operative on the descent of said tool for deënergizing said magnet, and means operative on the rise of said tool for re-applying said carriage-driving mechanism, substantially as described.

In testimony whereof, I have hereunto set my hand.

GEORGE PAUL THOMAS.

Witnesses:
CHARLES BARNETT,
FRIEDA E. WOLFF.